United States Patent [19]

Kadakia

[11] Patent Number: 5,111,192
[45] Date of Patent: May 5, 1992

[54] METHOD TO ROTATE A BITMAP IMAGE 90 DEGREES

[75] Inventor: Vinod K. Kadakia, Rancho Palos Verdes, Calif.

[73] Assignee: Xerox Corporation, Stamford, Conn.

[21] Appl. No.: 453,738

[22] Filed: Dec. 20, 1989

[51] Int. Cl.$^5$ ............................................. G09G 1/06
[52] U.S. Cl. ................................... 340/727; 340/750
[58] Field of Search ............... 340/727, 724, 723, 799, 340/750; 382/46

[56] References Cited

U.S. PATENT DOCUMENTS

| | | | |
|---|---|---|---|
| 3,976,982 | 8/1976 | Eiselen | 340/705 |
| 4,052,699 | 10/1977 | Micka et al. | 382/46 |
| 4,168,488 | 9/1979 | Evans | 382/46 |
| 4,271,476 | 6/1981 | Lotspiech | 382/46 |
| 4,562,485 | 12/1985 | Maeshima | 382/41 |
| 4,593,407 | 6/1986 | Konishi et al. | 382/46 |
| 4,627,020 | 12/1986 | Anderson et al. | 382/46 |
| 4,636,783 | 1/1987 | Omachi | 382/46 |
| 4,701,752 | 10/1987 | Wang | 340/727 |
| 4,776,026 | 10/1988 | Ueyama | 340/727 |
| 4,837,845 | 6/1989 | Pruett et al. | 340/727 |

OTHER PUBLICATIONS

Konnerth, "Realtime Rotation and Mirror Transformation of Square Images", IBM Technical Disclosure Bulletin, vol. 27, No. 1B, Jun. 1984, pp. 831-834.
IEEE CG&A, The Image Prism: A Device for Rotating and Mirroring Bitmap Images, Cary Kornfeld, AT&T Bell Laboratories.

Primary Examiner—Jeffery A. Brier
Assistant Examiner—Xiao M. Wu
Attorney, Agent, or Firm—Robert E. Cunha

[57] ABSTRACT

An algorithm for rotating an image 90 degrees starts with an array or r rows and c columns of pixels. Each column of the pixel array is partitioned into words of w pixels each, and the rows, the columns, the words in each column, and the pixels in each word of the pixel array are all numbered starting at zero. Let $v = r/w$, where r/w is the smallest integer greater than or equal to r/w. Similarly, let $h = c/w$. The algorithm stores words of the original pixel array into a linear word organized memory as follows: it circular right-shifts each word i of column j by (j)mod w pixel positions and then writes in parallel this modified word into word address $vj+i$ of the memory. The algorithm fetches words of the stored pixel array from this memory rotating this pixel array 90 degrees as follows: it reads a whole word in parallel such that each pixel p of this word comes from pixel p of word address $wvi+v((p+j+1) \bmod w)+ wv-j-1/w)$ and then circular right-shifts this word by (j+1)mod w pixel positions, thereby delivering word i of column j of a 90 degree rotated version of the original pixel array.

6 Claims, 11 Drawing Sheets

|   |   |   |
|---|---|---|
| 3  7  11  15 | 19  23  27 | |
| 2  6  10  14 | ⓪③ⓘ③㉓㉝<br>⓪② 12  22  32<br>⓪① 11  21  31<br>⓪⓪ 10  20  30 | |
| 1  5  9  17 | 17  21  25  29 | |
| 0  4  8  12 | 16  20  24  28 | |

WORD #

FIG. 1

| | | |
|---|---|---|
| 3  7  11  15 | P = 2<br>WORD #18 | 3<br>2<br>1<br>0 |
| 2  6  10  14 | 03  12  21  30<br>02  11  20  33<br>01  10  23  32<br>00  13  22  31 | 3<br>2<br>1<br>0 |
| 1  5  9  17 | 17  21  25  29 | 3<br>2<br>1<br>0 |
| 0  4  8  12 | 16  20  24  28 | 3<br>2<br>1<br>0 |

CHIP #

OF ROWS    R = 16
OF COLS    C = 12
BITS / WORD    W = 4
WORDS / COL    V = 4
WORDS / ROW    H = 3

*FIG. 2*

$$16i + 4\,[(P=j+1)\bmod 4] + \left[\frac{15-j}{4}\right] = 18 \quad \text{word \# in Fig. 2}$$

FIG. 3

| | | | |
|---|---|---|---|
| 2 | | | |
| 1 | ㉝ 32 31 30<br>㉓ 22 21 20<br>⑬ 12 11 10<br>⓬ ⓬ ⓬ ⓬<br>03 02 01 00 | | |
| 0   3 | | | |

FIG. 4

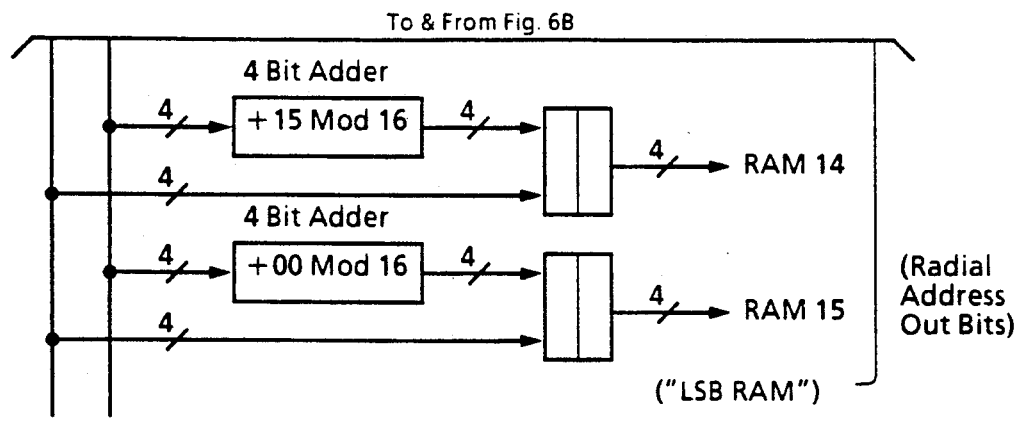
FIG. 6C
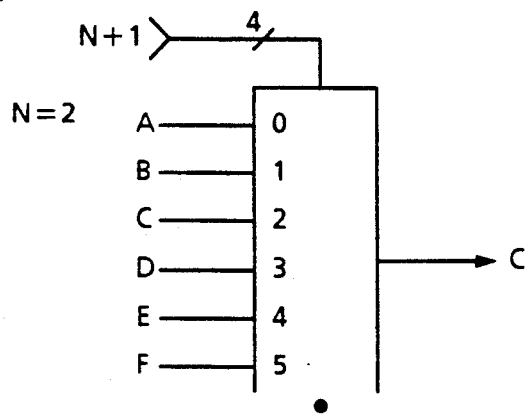
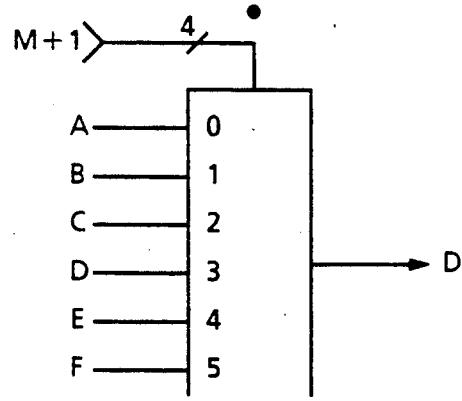
FIG. 7
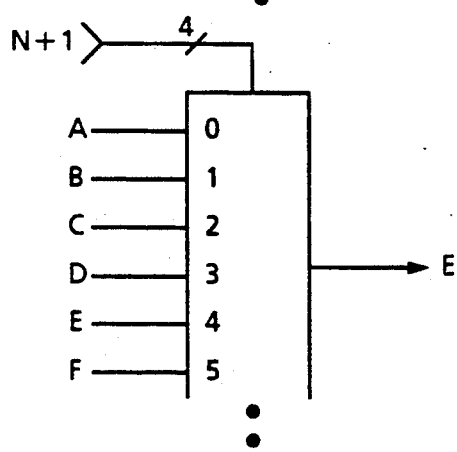

METHOD TO ROTATE A BITMAP IMAGE 90 DEGREES

BACKGROUND OF THE INVENTION

This invention is a circuit for rotating a digital image by multiples of ninety degrees by transferring the original image from memory, a raster input scanner or the like, into a buffer using a first addressing and shifting process, and using a second addressing and shifting process to read out from the buffer back into the memory, raster output scanner or the like, so that the image is rotated, all bits of each word being transferred to and from the buffer in parallel.

The representation of a visual image by a two-dimensional array is well known. Such an array is typically composed of rows and columns of picture elements, termed pixels. Such a pixel may represent the color or density of a spot of the total image, and can be one or a number of binary bits or words, or analog voltages. A principal advantage of this representation is that it allows image processing systems to handle pixels one at a time, rather than to try to handle the whole picture all at once. For systems which transmit, display or print images from pixels, the usual one-at-a-time pixel order is a scheme called "raster ordering". In raster ordering, a pixel array is divided into scan lines corresponding to its columns (or to its rows), and pixels are sequentially accessed in the same direction along each scan line, starting with the first scan line along one edge of the pixel array and continuing with the next adjacent scan line until all the scan lines have had their pixels accessed. To increase the performance of image processing systems, each scanline of a pixel array is often partitioned into fixed-size subsets of adjacent pixels, called "words", the word size being a constant over the entire pixel array. In such systems an entire word is transferred or stored at a time. Memory subsystems for storing an entire word of pixels in parallel this way are called "word organized memories". Storing a pixel array in raster order into a linear word organized memory results in the words of each scanline occupying consecutive word addresses and the scanlines of the array abutting end to end.

It is a common requirement in digital document processors that a page that is scanned into the system in one orientation be printed out in another. An example would be a scanned-in image which was stored in the system in the "landscape" mode, but must be printed in the "portrait" mode. In this case, it is easier for the operator to rotate the image electronically than to re-scan the image, and is the only way if the original is no longer available. Also, in many systems, the image is displayed to the operator for editing on a display which uses horizontal scan lines and then printed on a printer which uses vertical scan lines. The result is that a printing system needs to be able to create rotated and un-rotated images at any stage of processing. However, because of the memory order, the parallel fetch of adjacent pixels along a scanline is easier to accomplish than the parallel fetch of adjacent pixels perpendicular to the scanlines. For example, in a typical memory of sixteen bit words, the first sixteen bit word of an image is loaded into the first bit of the first sixteen memory chips, the second word is loaded into the second bit of the sixteen memory chips, etc. Therefore, if a line comprising bits in the direction of the word length is needed to be output, sixteen bits at a time may be accessed in parallel since each bit is in a different memory chip. However, if the line is perpendicular to the word length, then the individual bits are all in the same chip and can only be accessed serially, which is a very slow process in comparison.

The difficulty of word-parallel access to both the rows and columns of a stored pixel array has presented a considerable challenge to the prior art. Image processing systems have often needed to change the scan direction or image orientation of a pixel array by 90 degrees. Some approaches, like those of U.S. Pat. Nos. 3,976,982, and 4,562,485 use slow one-pixel-at-a-time access. Other approaches store a pixel array into memory and then incur a delay by performing a separate conversion process to change the pixel array into a stored 90 degree rotated version before transmitting, displaying or printing it. Many of these approaches do this by transferring small subsets of the pixel array at a time to a separate rotator, as in U.S. Pat. Nos. 4,052,699; 4,168,488; 4,271,476; 4,593,407; 4,627,020; 4,636,783, and also the system described by Kornfeld in "The Image Prism: A Device for Rotating and Mirroring Bitmap Images", IEEE Computer Graphics and Applications, May 1987. Thus, all of the store-and-convert approaches require at least one additional fetch and store of the entire pixel array after its initial storage in memory.

What is required is a rotation method which needs only one data transfer into the buffer and only one data transfer out of the buffer, and where these two data transfers operate on entire words in parallel.

SUMMARY OF THE INVENTION

An image can be rotated using all parallel transfers of data words only if all bits of the original data words in each row are put into different chips and all bits in each column are also put into different chips. Then, by appropriate addressing, either horizontal or vertical strips of the original image can be output in parallel from the buffer.

The system for accomplishing this can be explained, to use a simple numerical example, by taking a string of data words as they are received from any source, shifting word #0 by zero bits, word #1 by one bit, word #2 by two bits, etc. and then loading them into the buffer. The shift is of the circulating type, where a bit that falls off the end of the word is inserted in at the beginning. All the bits in an image line in the direction of the word are still in different chips, but also, all the bits in an image line perpendicular to the word length are now also in different chips. Then, by addressing the appropriate bit in each buffer chip properly, either horizontal or vertical word length lines may be taken out of the buffer in parallel, shifted again and output as a rotated image. For the shifts, a parallel shifter is used so that a shift of from 0 to 15 bits can be accomplished in one clock cycle.

BRIEF DESCRIPTION OF THE DRAWINGS

FIG. 1 is an image as it is received by the rotation circuit.

FIG. 2 is an image as it is stored in the buffer.

FIG. 3 is an image as it is accessed from the buffer.

FIG. 4 is an image in its rotated form.

FIGS. 6A–6C is a simplified schematic diagram of the rotation circuit.

FIG. 7 is a simplified schematic of the parallel shifter.

DETAILED DESCRIPTION OF THE INVENTION

Figure 5:
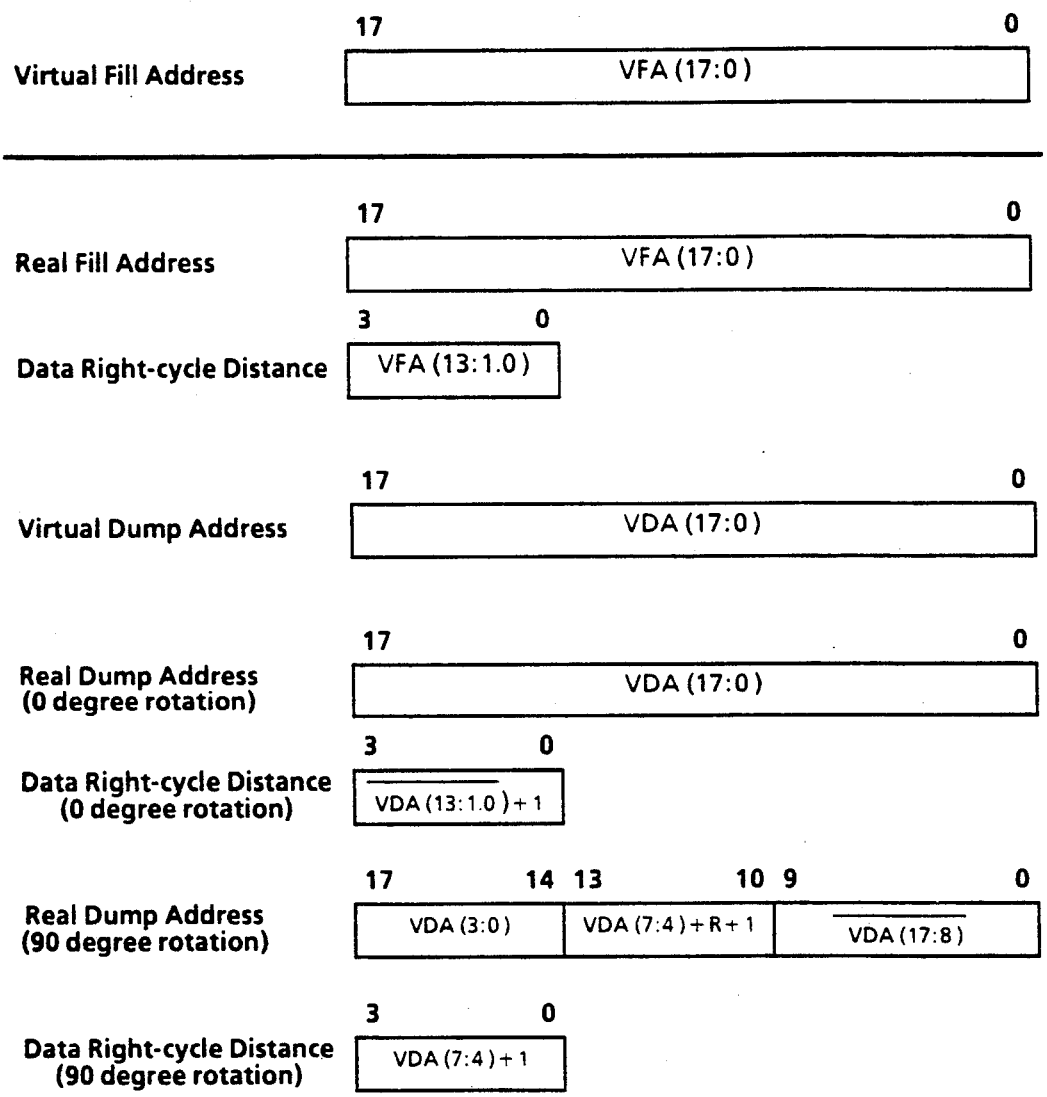
FIG. 5 is a diagram showing the contents of the various address fields required by the rotation circuit.

FIGS. 1, 2 and 4 show, respectively, an original image in the form of a right angle as would be received from memory or a scanner, a buffer containing an intermediate image in a form that can be rotated any multiple of 90 degrees, including 0 degrees, and the rotated image as would be sent back to memory. For simplicity, the buffer is shown as 4 by 4 bits and there are 4 bits per word, but this algorithm will work for a system of any size. Also, for greater ease of understanding, the unrotated image is shown as coming from a memory, and the rotated image is shown as being output to a memory, but, as explained above, the image can be received from any source, and transmitted to any type of device. These figures assume a vertical scanline so that the words 0, 1, 2 and 3 of FIG. 1 are the words in the left column, from bottom to top, as shown. The next scan line starts with words 4, 5, etc. These FIG. 1 word addresses are referred to as virtual fill addresses because they do not identify actual memory addresses, and because these are the numbers that are used by the algorithm to generate the addresses of locations which are used to fill the buffer.

To rotate the image, the first step is to shift and transfer each word of the original image to the buffer. One of the key features of this invention is that the words do not need to be loaded into or unloaded from the buffer in any particular order. Also, any subset block of words can be processed independently of the rest of the image. For example, let us consider the processing of words 18, 22, 26 and 30 which constitute one 4 by 4 bit block of an image that must be rotated 90 degrees CCW. The four bits (00, 01, 02, 03) of word 18 comprising the original vertical line are shifted up 0 bits in a recirculating shifter and loaded into the same location, 18, of the buffer. Next, the bits (10, 11, 12, 13) of word 22 are up shifted one bit and loaded buffer word 22. Next, word 26 is shifted 2 bits and loaded into word 26 of the buffer. Finally, word 30 is shifted 3 bits and loaded into location 30 of the buffer. Now, as shown, not only is each bit of each original vertical line loaded into a different chip, but also each bit of each original horizontal line is also loaded into a different chip. Therefore either the original horizontal or vertical lines can now be accessed from the buffer in parallel.

The second step is to read the bits from the buffer of FIG. 2, shift them the appropriate number of bits, and load them into, say, a memory, FIG. 4, as a rotated image. Note that the original image of FIG. 1 is four words high and three words wide. If the entire image is rotated 90 degrees the resultant image will be three words high and four words wide, as shown in FIG. 4.

This portion of the algorithm can be thought of as comprising two steps, the first being the assembling the bits of each word, resulting in the image of FIG. 3, and the second being the shifting of those bits within the word to result in the image of FIG. 4.

Let us use word 13 of FIG. 3 as an example. The bits or pixels required are 13, 23, 33 and 03, which correspond to bit 0 of word 22, bit 1 of word 26, bit 2 of word 30 and bit 3 of word 18 of FIG. 2. Each is in a separate buffer chip so all can be addressed and accessed at once, in parallel, and output as word #13. The remaining three word transfers are similarly accomplished to produce the 4×4 bit block shown in FIG. 3.

Finally, an up shift is required to complete the rotation. Words 13, 16, 19 and 22 are shifted up 1, 2, 3 and 0 bits respectively. The result is shown in FIG. 4 as the completely shifted image. The result of the entire algorithm is a rotated image, as shown, resulting from two parallel transfers and two shifts. Since the shifts are also done using a parallel shifter, to be discussed below, the entire rotation is done using parallel operations.

A similar addressing technique can be used to rotate the image 270 degrees during the transfer between the buffer of FIG. 2 and the memory of FIG. 4. A shift of 0 degrees is done simply by shifting the words in the buffer back to their original form and outputting them to the memory. Note, since each rotated word is accessed from the buffer, shifted and loaded directly into the memory, there is no storage device having the image of FIG. 3. This figure is only produced here as an aid in understanding the invention.

This system may be generalized using mathematical notation as follows: An algorithm for rotating an image 90 degrees starts with an array of r rows and c columns of pixels. In FIG. 2, for example there are 16 rows and 12 columns so $r=16$ and $c=12$. Each column of the pixel array is partitioned into words of w pixels each, and the rows, columns, words in each column, and the pixels in each word of the pixel array are all numbered starting at zero. In FIG. 3 there are 4 bits per word so $w=4$.

In fact, in the most general case, the buffer word size need not coincide with the image data word size. For example, if five bit image data words were to be stored in a sixteen bit buffer memory, it would take one memory word (16 bits) to store three data words (15 bits) and two memory words (32 bits) to store four data words (20 bits).

Also, the image dimensions need not be whole number multiples of the memory word size. Mathematically stated, let v, the vertical dimension of memory in words, equal $r/w$, where $r/w$ is the smallest integer greater than or equal to $r/w$. Similarly, let h, the horizontal dimension of memory, equal $c/w$. In FIG. 2 $v=4$ and $h=3$.

The algorithm stores words of the original pixel array as shown in the example of FIG. 1 into a linear word-organized buffer memory as shown in FIG. 2 as follows: it circular right shifts each word i of column j by (j) mod w pixel positions and then writes the bits of this modified word in parallel into word address $vj+i$ of the buffer memory. To use a numerical example based on FIGS. 1 and 2, the words to be stored in column 0 are shifted 0 bits, column 1, 2 and 3 words are shifted 1, 2 and 3 bits respectively, and the words in column 4 start at 0 again. These 5 words are then are stored into the first 5 locations of memory which are the 4 locations of col 0 and the first location of column 1.

The next step in the algorithm is to fetch each word of the stored pixel array in parallel from the buffer so that each pixel p in FIG. 3 comes from each pixel p in FIG. 2 of word address $$wvi+v((p+j+1) \bmod w)+(wv-j-1)/w$$

Still using the example of FIG. 3, this reduces to $$16i+4((p+j+1) \bmod 4)+(15-j)/4$$

As a numerical example, for bit 02 in column 5 of FIG. 3: p, the pixel number in the word, equals 2. i, the word number in the column, equals 1. And j, the column number, equals 5. Substituting all of the constants of FIG. 2 and the variables of FIG. 3 into the above equation yields an answer of 18. That is, pixel 2 of word 16 of FIG. 3 must be accessed from the same pixel (2) of word 18 of FIG. 2.

The final step is to shift this word up two bits before outputting to the memory of FIG. 4.

The equations above describe the algorithm mathematically, but if h, v, and w happen to be whole number powers of 2, then the addresses can also be generated in software or in hardware by masking and shifting bits. An example of a system for performing this process is shown in FIG. 5 which assumes an original image having 16 one-bit pixels per word, 1,024 words per scan line and 256 scan lines. Therefore, to identify any input word within the allowable image size requires an 18 bit address (17:0). The words in this entire image are arbitrarily assigned addresses starting from 0, rather than using the actual addresses in memory, and are therefore referred to as "virtual" addresses, and are used to "fill" the buffer. FIG. 5 shows the virtual fill address (VFA) as 18 bits (17:0).

The buffer is implemented from 16 chips, each having 256K bits. Therefore, the address of each bit in each chip, and the address of each word in the buffer, is also an 18 bit word. This address is called a real fill address since it is the address of an actual buffer location, and is used to fill the buffer. As shown in FIG. 5 the virtual fill address and the real fill address which are used to fill the buffer are identical.

Each word to be transferred must also be shifted before being stored in the buffer. In this example, the shifts range from 0 to 15 bits, and are therefore defined by a 4 bit number, referred to as the data right-cycle distance in FIG. 5. Assuming that the original image has 1,024 words per scan line, then the 10 least significant bits of the address, bits 9:0, comprise the number of the word in the scan line, and the next 4 bits, 13:10, comprise the least significant 4 bits of the scan line number, which is also the number of shifts required. Therefore bits 13:10 of the VFA are shown as the right-cycle distance in FIG. 5.

To transfer a word of data out from the buffer, first the output word number must be picked. The word number is 18 bits in this example, and is referred to in FIG. 5 as the virtual dump address, VDA (17:0). For the purposes of image rotation, this VDA can be thought of as uniquely selecting a 16-bit word of a 90 degree rotated version of the original image. This rotated image would now have 16 words per scan line and 16,384 scan lines. Thus, the least significant 4 bits of the VDA, bits 3:0, would be the number of the word in one of these new scan lines, and the most significant 14 bits, bits 17:4, would be the scanline number. The locations in the buffer from which 16 bits of data must actually come is referred to in FIG. 5 as the real dump address and is assembled as follows: The most significant bits (17:14) are taken from the VDA (3:0), the next four bits are the VDA (7:4) plus the pixel number R plus 1, and the least significant 10 bits are the VDA (17:8) inverted. Sixteen of these addresses must be assembled, one for each bit, in order to read the data out. The final circular right shift distance of 0 to 15 bits is assembled as VDA (7:4)+1.

Figure 6A:
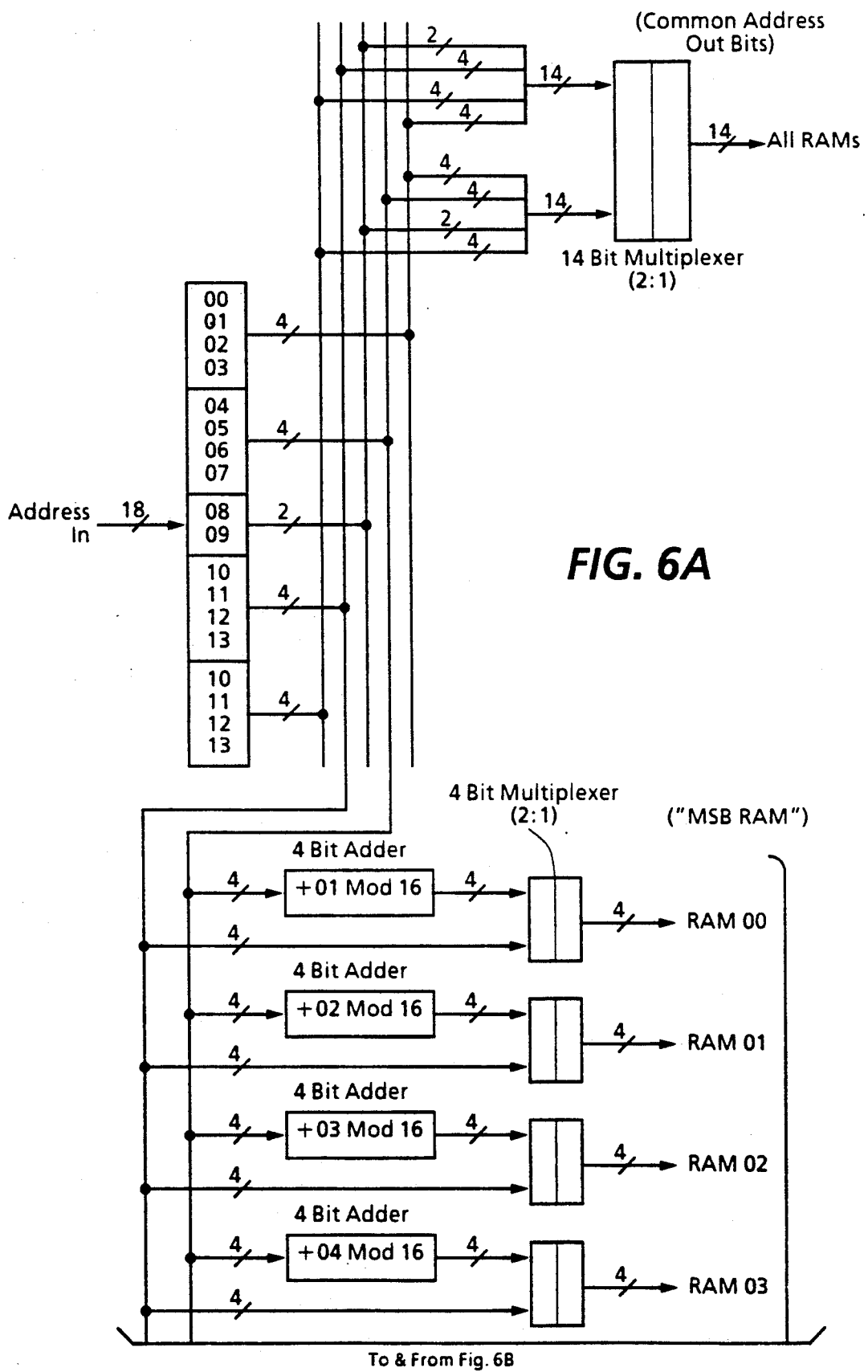
Figure 6B:
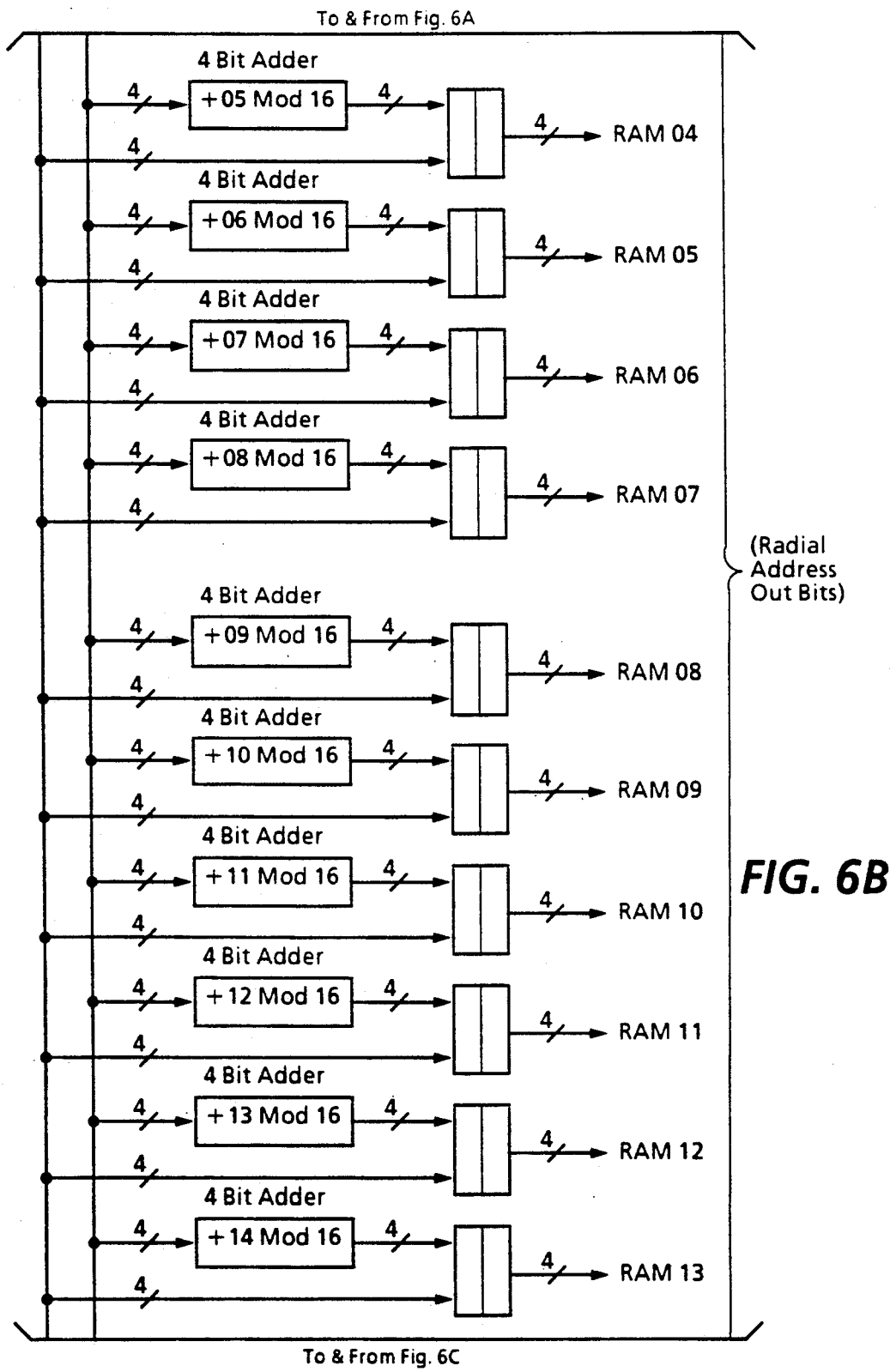

The above fields can be the basis for a program to fetch and shift the image words or can be used to drive a circuit which generates the actual addresses, a diagram of which is shown as FIGS. 6A-6C. The input is the 18 bit virtual dump address broken into fields as shown. In all cases, if the image is not to be rotated the lower group of signals is selected in all of the 2-to-1 multiplexors, while the upper group is selected for a 90 degree rotation. For each 16-bit by 16-bit aligned block of either the original or rotated image there are going to be 14 address bits in common. These are output by the 14 bit multiplexer.

The remaining four bits of the addresses for each chip will be the same for each chip in the unrotated case, and different for each chip in the rotated case. For the unrotated case, the remaining 4 bits 13:10 remain unchanged and are applied to the lower half of each 4 bit multiplexer to provide the remaining address bits. For the rotated case, the bit addresses will be different for each chip. This is accomplished by starting with bits 7:4 of the input address, and providing sixteen 4 bit adders, each generating a sum of a number between 0 and 15 and the four bit address field. The output of each is used as the rotated address input to the sixteen 4 bit multiplexers.

FIG. 7 is a simple schematic diagram of the first 6 bits of the first three multiplexers of one possible sixteen bit parallel cyclic shifter which can shift a 16 bit word any number of bits in one clock cycle. The first six bits of the input word are represented by the letters A through F, and are applied to input pins 0 through 5 of all multiplexers. The address input to each multiplexer is applied through an adder that adds the constants 0, 1, 2 . . . to the number n of shifts required. Thus, if n=2, the first multiplexer will select pin 2, the second will select pin 3, the third will select pin 4, etc. Therefore the output word CDEF is shifted two bits from the input word ABCD in one clock cycle.

Figure 9:
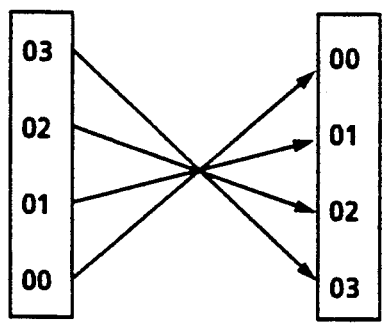
FIGS. 9 and 10 show the process of making a top to bottom mirror image.
Figure 11:
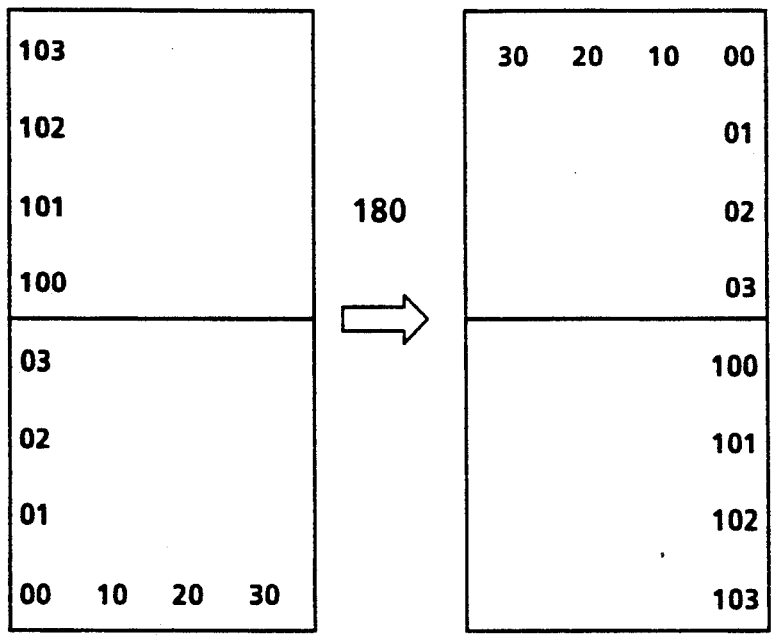
FIG. 11 shows the process of making a 180 degree rotation.
Figure 14:
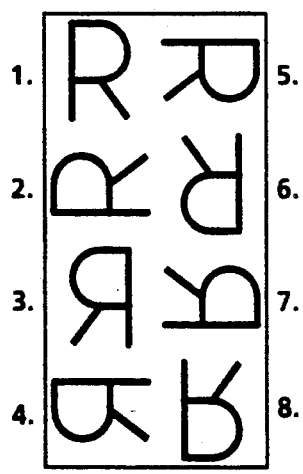
FIG. 14 shows all the possible output images.

FIG. 14 shows the eight possible orientations of an image. As has been explained above, the original unrotated image 1 may be rotated 90 degrees to generate example 5, or may be rotated 270 degrees to generate example 2. Also, the original image may be output by reversing the steps in the loading process. The 180 degree rotation, example 6, can be accomplished as shown in FIG. 11. In this case the words are read out in reverse order. Therefore, as shown, the last word of the upper block of the original image becomes the first word of the lower block of the rotated image. In addition, the pixels must be reversed. This is accomplished simply by transferring the word through a pixel shifter as shown in FIG. 9. The top pixel of the input register on the left is hardwired to the bottom location of the register on the right, the remaining pixels being wired similarly as shown. The result of this process of scanning and shifting is a rotation of 180 degrees.

Figure 8:
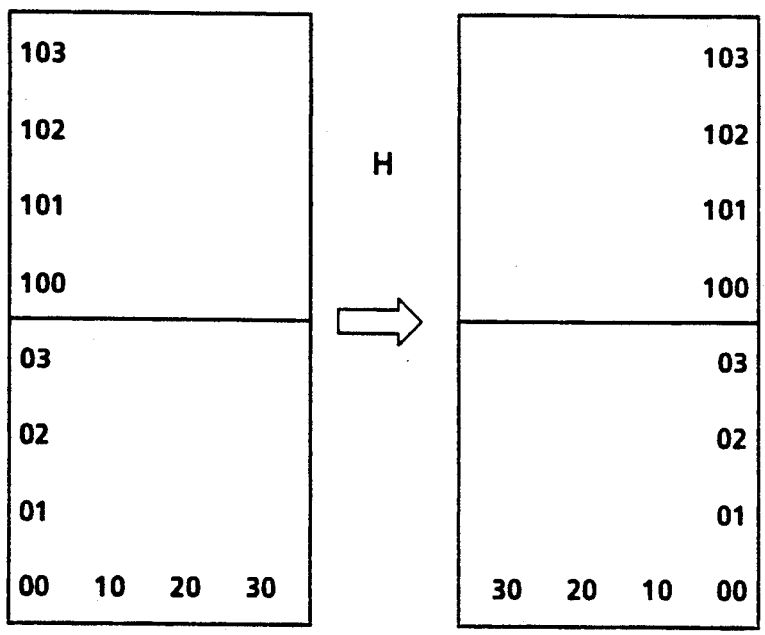
FIG. 8 shows the process of making a left to right mirror image.

A mirror image, where the image is reversed left for right, as shown in FIG. 14 examples 1 and 3, can be created using the process shown in FIG. 8. Here the scan lines are read out in the reverse order that they are received in. The first column input is used as the last column output, etc.

Figure 10:
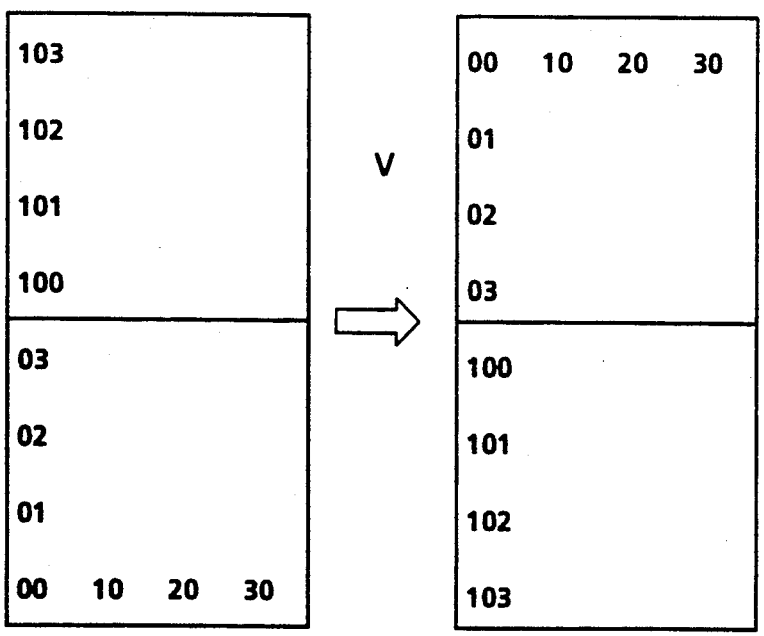

A mirror image, where the image is reversed top for bottom, as shown in FIG. 14 examples 1 and 8, can be created using the process shown in FIG. 10. Here the scan lines are read out in the regular order but within each column the words are reversed from bottom to top, and the pixel order within each word is also reversed, using the circuit of FIG. 9.

Figure 12:
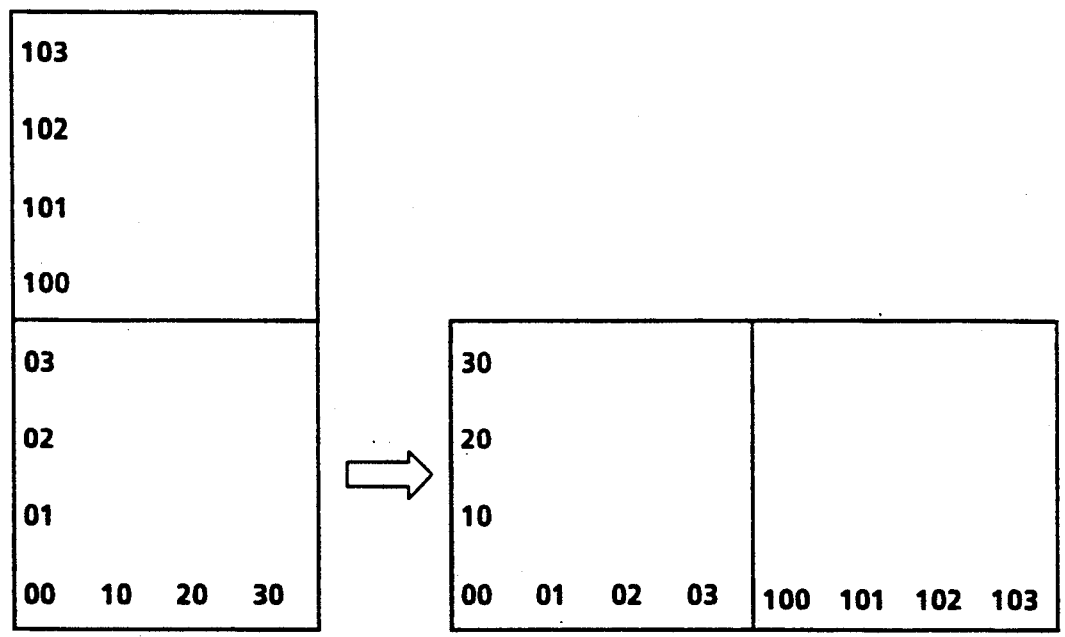
FIG. 12 shows the process of making a top to bottom mirror image of a 90 degree rotation.
Figure 13:
FIG. 13 shows the process of making a left to right mirror image of a 90 degree rotation.

Finally, the process of rotating an image 90 or 270 degrees can be combined with the process of producing a mirror image or a rotation of 180 degrees to produce different orientations. The rotation of an image 90 degrees followed by a top to bottom mirror imaging is shown in FIG. 12 to produce example 7 of FIG. 14. Similarly, the 90 degree rotation of an image followed by a left to right mirror imaging is shown in FIG. 13 and results in example 4 of FIG. 14.

All of the word transfers of FIGS. 8 through 13 are parallel and therefore may be combined with the rotations of 90 and 270 degrees described above to produce any possible orientation without increasing the processing time.

While the invention has been described with reference to a specific embodiment, it will be understood by those skilled in the art that various changes may be made and equivalents may be substituted for elements thereof without departing from the true spirit and scope of the invention. For example, each pixel may be represented by one or a plurality of binary words or analog voltages. In addition, many modifications may be made without departing from the essential teachings of the invention.

What is claimed is:

1. The method of rotating an original n column by n row image, each column comprising a word, comprising the steps of:
    A. storing said image in a buffer, said storing step comprising the steps of:
        a. first circular shifting each original word by a number of pixels equal to the column number, and
        b. storing each shifted word in the location of said buffer equal to the column number, and
    B. outputting an n column by n pixel image from said buffer, where the column number j and the pixel number i of the buffer varies from 0 to n−1, said outputting step for each word output comprising the steps of:
        a. assembling the jth output n pixel word from n pixels of the buffer, where pixel number i of the assembled word comes from pixel number i of word number (i+j+1)mod n of the buffer, and
        b. second circular shifting the resultant word j+1 pixels.

2. The method of reorienting an image comprising the steps of:
    using the method of claim 1 to rotate an image, and reversing the order of the scan lines to produce a mirror image.

3. The process of reorienting an image comprising the steps of:
    using the method of claim 1 to rotate an image, and reversing the order of the pixels in each scan line to produce a mirror image.

4. A method of rotating an original image having r rows, c columns, w pixels per word, v words per column and h words per row, into a rotated image using an index i to count the words, where i varies from 0 to h−1 and using an index j to refer to the columns where j varies from 0 to r−1, comprising the steps of
    first circular shifting each word in the original image by a number of shifts equal to its column number,
    storing each word in a buffer memory so that the word number in the buffer equals the word number of the original image,
    reading out one word at a time from the buffer wherein each pixel p of this output word comes from pixel p of buffer word address wvi+v((p+j+1)mod w)+ (wv−j−1)/w , and
    second circular shifting this assembled word (j+1)mod w pixels.

5. The method of reorienting an image comprising the steps of
    using the method of claim 3 to rotate an image, and reversing the order of the scan lines to produce a mirror image.

6. The process of reorienting an image comprising the steps of:
    using the method of claim 3 to rotate an image, and reversing the order of the pixels in each scan line to produce a mirror image.

* * * * *